(12) United States Patent
Tiwari et al.

(10) Patent No.: US 9,142,184 B1
(45) Date of Patent: Sep. 22, 2015

(54) SPEED FUNCTION MODULE AND NUMERICAL MINIMIZATION MODULE FOR AN ACTIVE CONTOUR MODEL

(71) Applicant: The MathWorks, Inc., Natick, MA (US)

(72) Inventors: Spandan Tiwari, Framingham, MA (US); Steven L. Eddins, Milford, MA (US); Jeff D. Mather, Milford, MA (US); Alexander J. Taylor, Jamaica Plain, MA (US); Ashish Uthama, Arlington, MA (US); Mara M. Yale, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 294 days.

(21) Appl. No.: 13/834,957

(22) Filed: Mar. 15, 2013

Related U.S. Application Data

(60) Provisional application No. 61/735,813, filed on Dec. 11, 2012.

(51) Int. Cl.
*G09G 5/00* (2006.01)

(52) U.S. Cl.
CPC ........................................ *G09G 5/00* (2013.01)

(58) Field of Classification Search
CPC ................ G06T 7/0083; G06T 7/0089; G06T 2207/10132; G06T 2207/20116; G09G 5/00
USPC .......................................................... 345/643
See application file for complete search history.

(56) References Cited

U.S. PATENT DOCUMENTS

| | | | | |
|---|---|---|---|---|
| 6,858,007 | B1* | 2/2005 | Akselrod et al. | 600/437 |
| 2002/0102023 | A1* | 8/2002 | Yamauchi | 382/199 |
| 2005/0276455 | A1* | 12/2005 | Fidrich et al. | 382/128 |
| 2008/0144935 | A1* | 6/2008 | Chav et al. | 382/173 |
| 2011/0295579 | A1* | 12/2011 | Tang et al. | 703/9 |

OTHER PUBLICATIONS

Chan et al., "Active Contours Without Edges", IEEE Transactions on Image Processing, vol. 10, No. 2, Feb. 2001, pp. 266-277.
Goldenberg et al., "Fast Geodesic Active Contours", IEEE Transactions on Image Processing, vol. 10, No. 10, Oct. 2001, pp. 1467-1475.
Whitaker, "A Level-Set Approach to 3D Reconstruction from Range Data", International Journal of Computer Vision 29(3), Jan. 7, 1998, pp. 203-231.

* cited by examiner

*Primary Examiner* — Ke Xiao
*Assistant Examiner* — Kim-Thanh T Tran
(74) *Attorney, Agent, or Firm* — Harrity & Harrity, LLP

(57) ABSTRACT

A device receives an image for an active contour model, where the active contour model includes a first module and a second module. The device receives an initial contour for the image and the active contour model, and executes a speed function of the first module, based on the image and the initial contour, to generate a speed function result. The device executes a numerical minimization method of the second module, based on the image and the speed function result, to generate a final contour, and provides the image and the final contour for display.

20 Claims, 14 Drawing Sheets

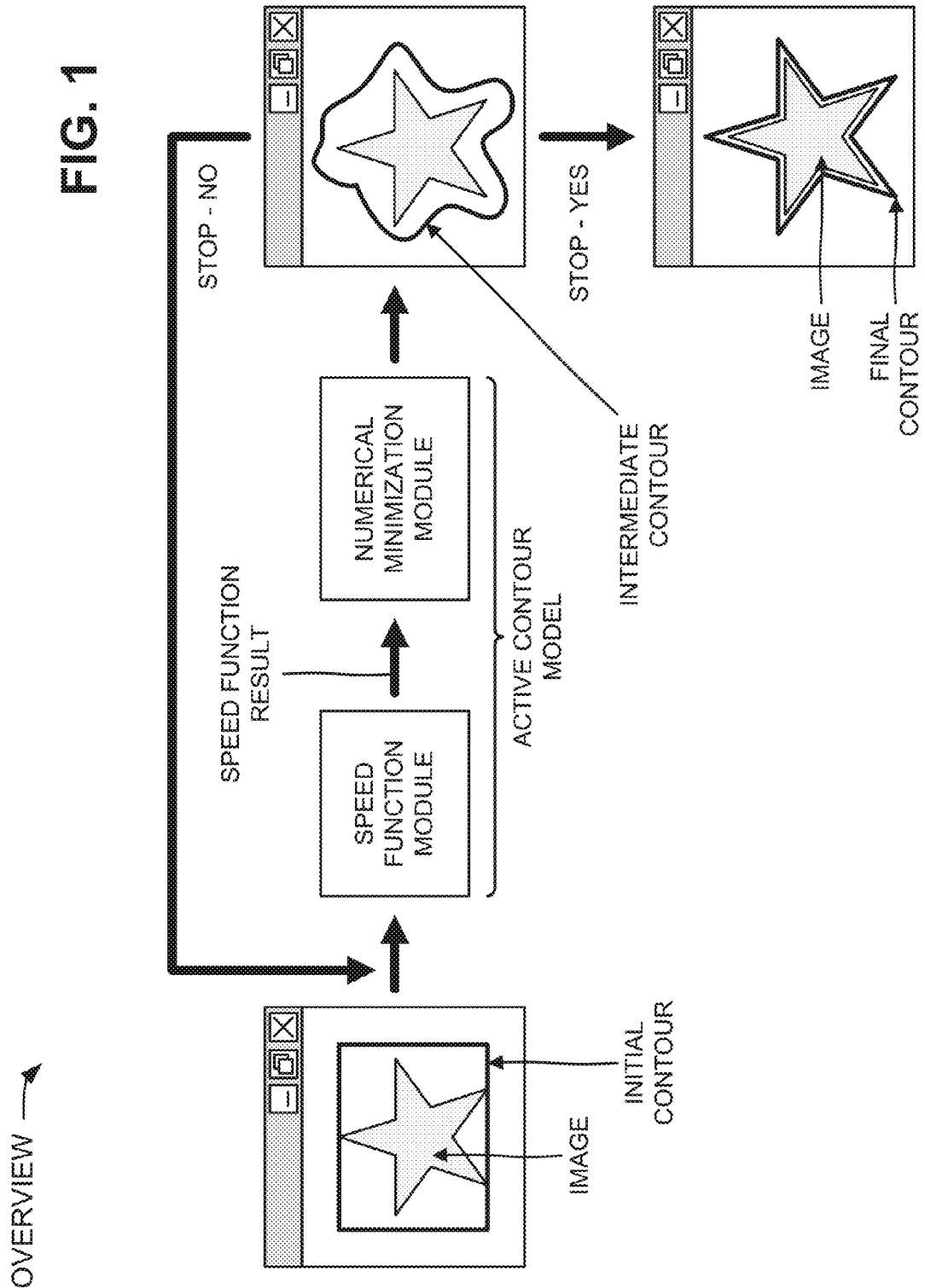

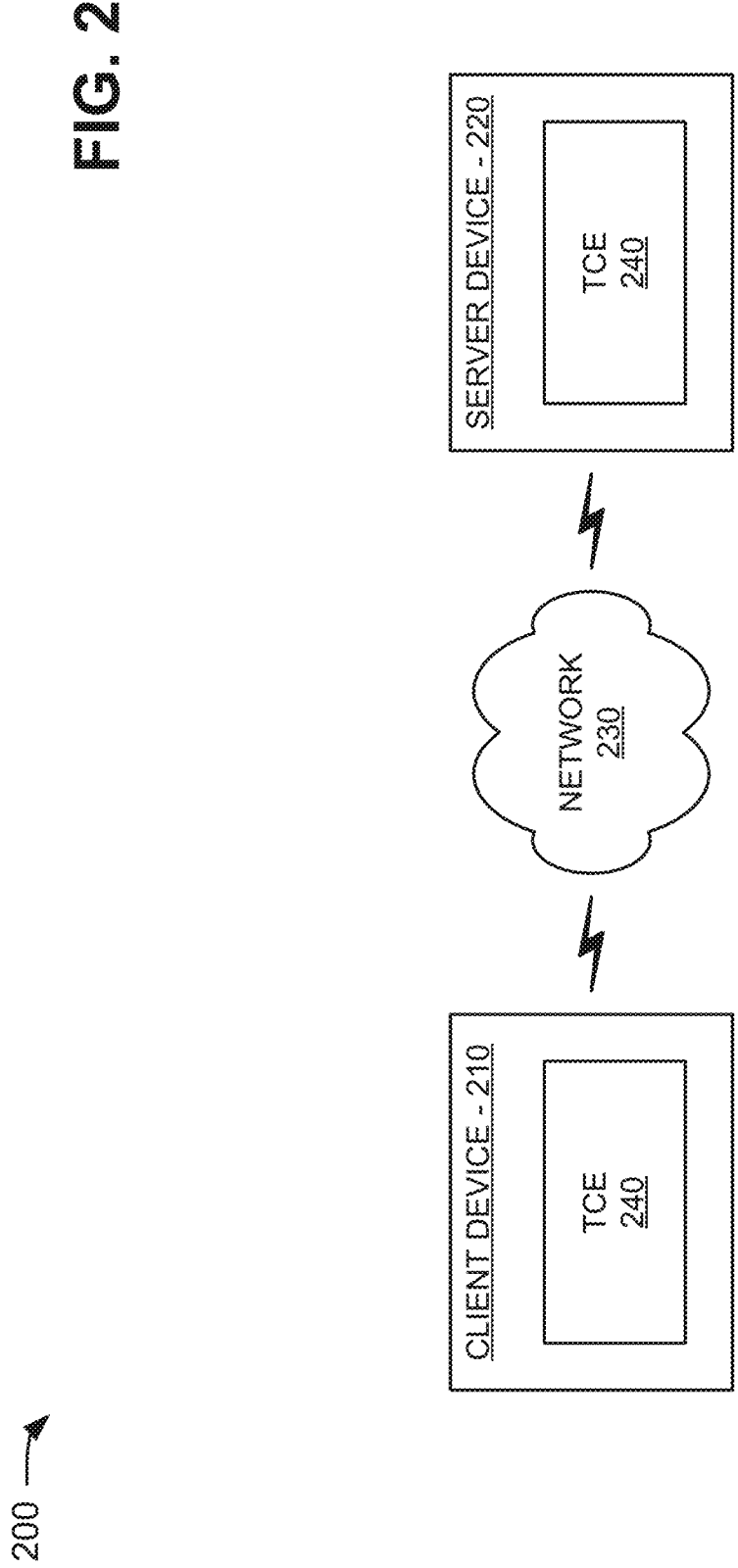

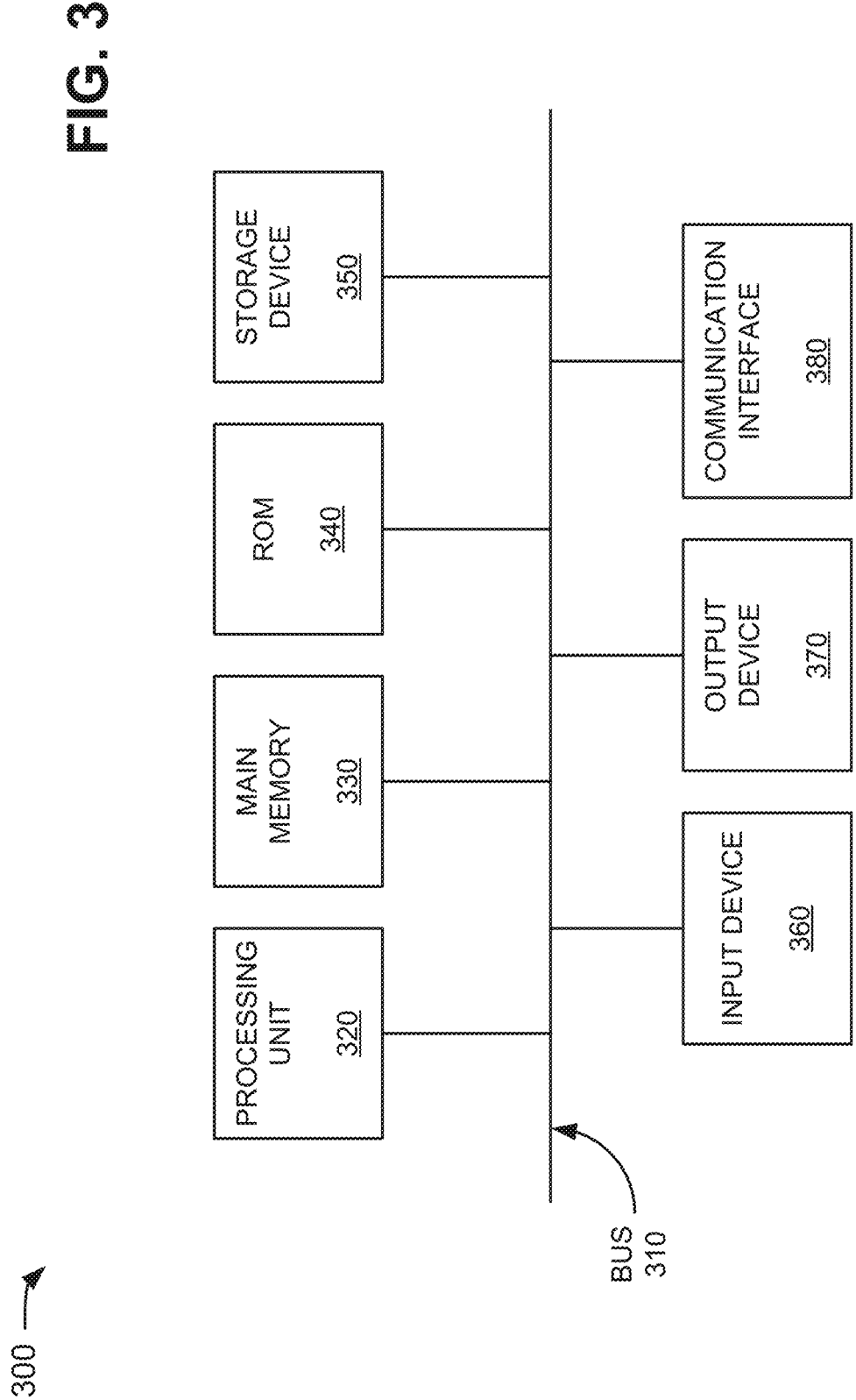

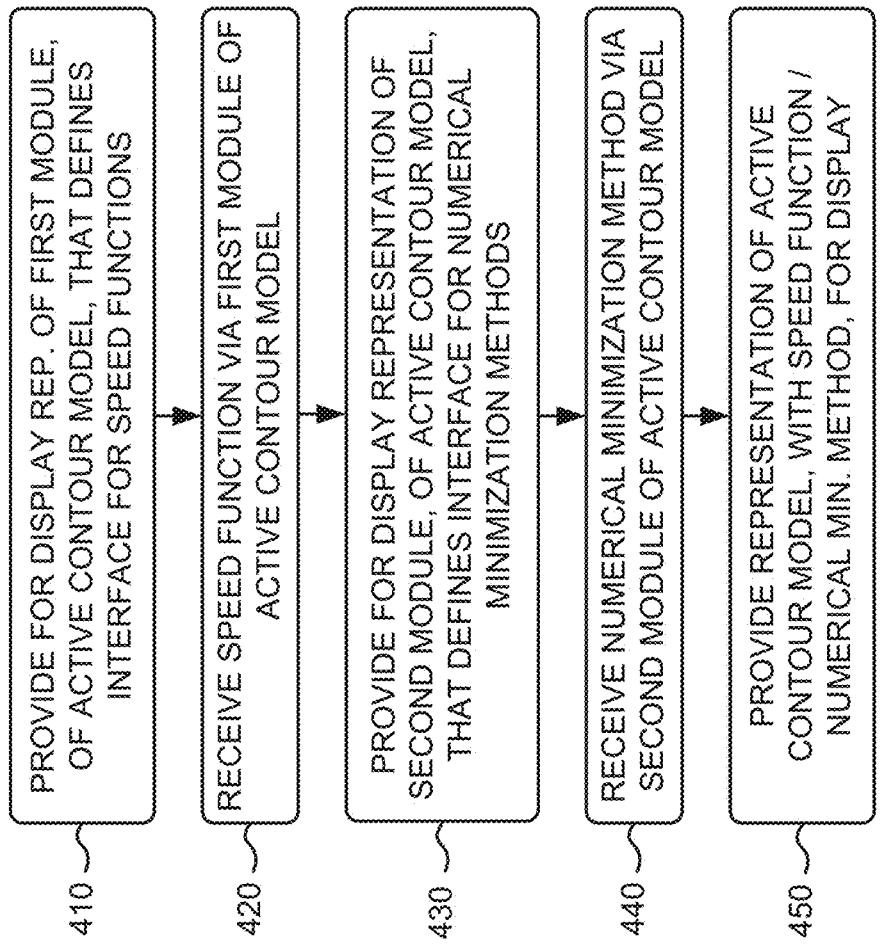

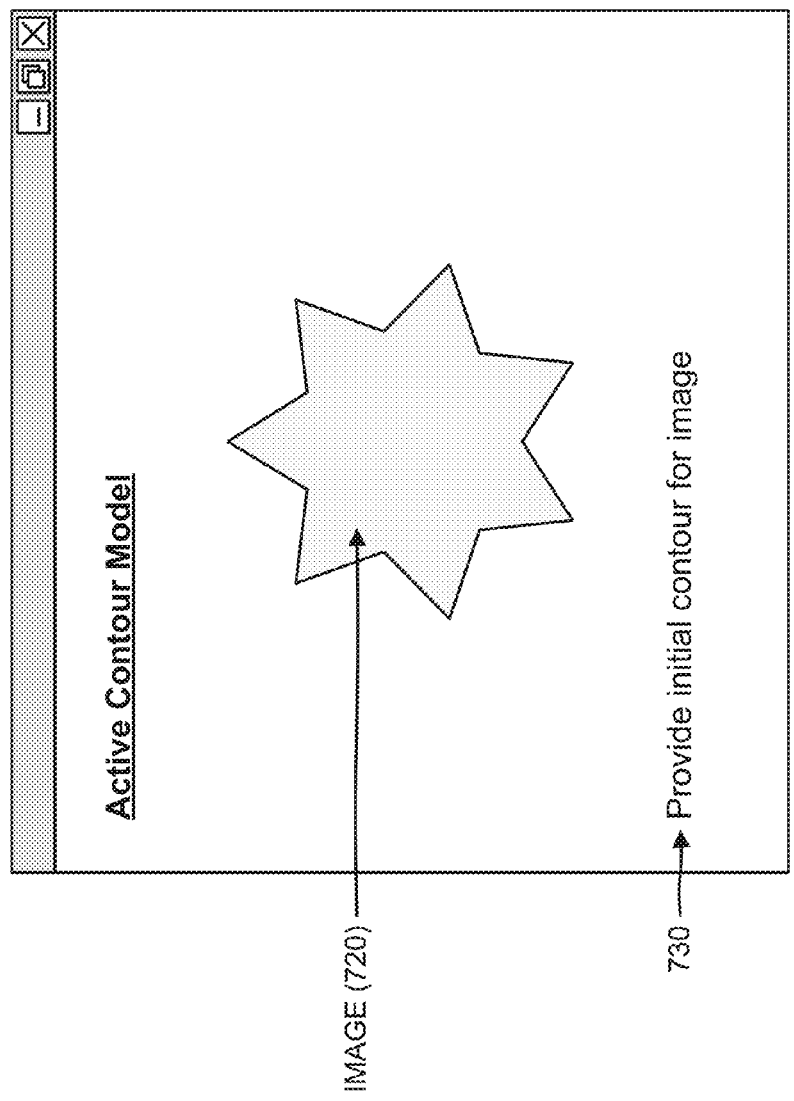

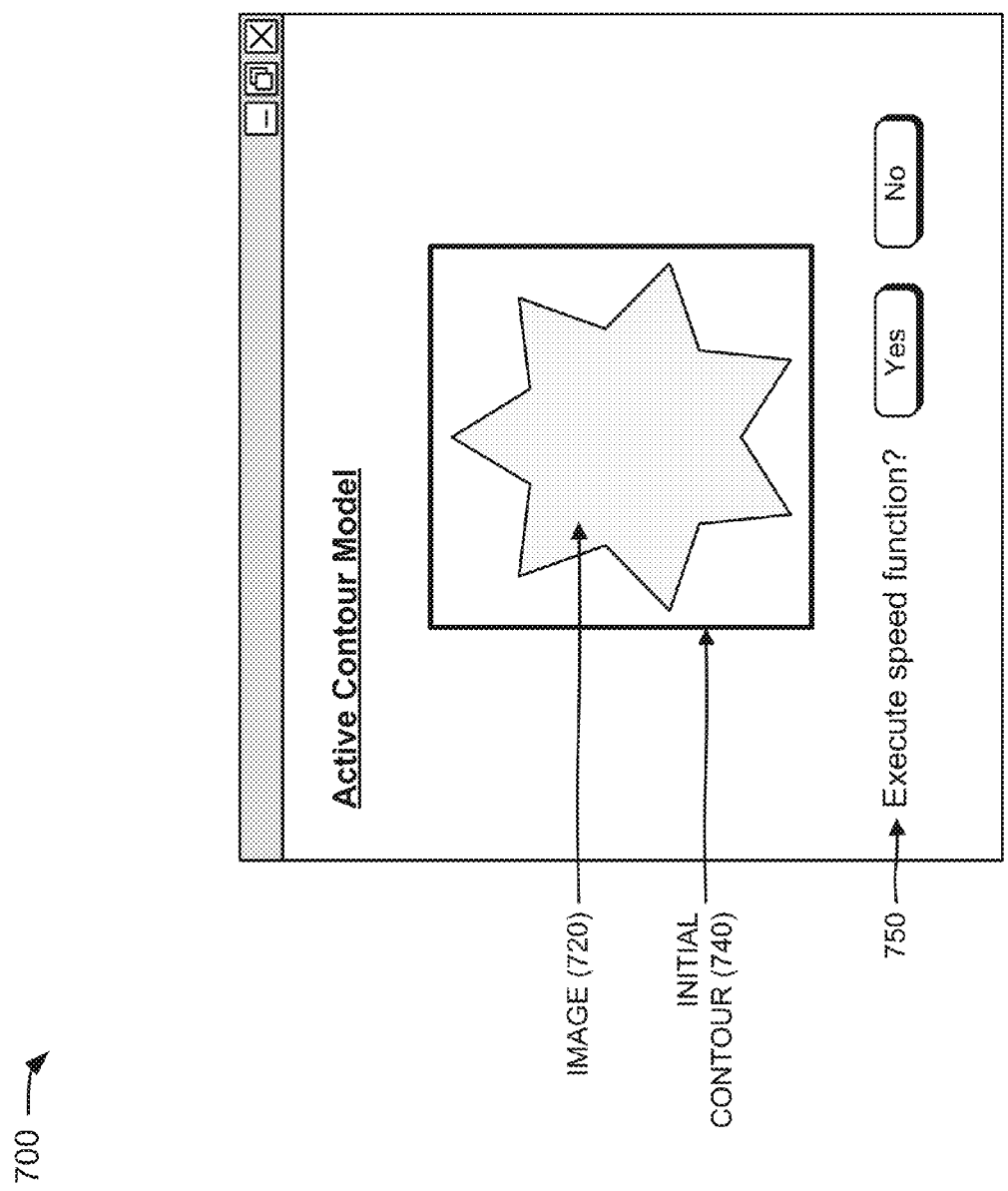

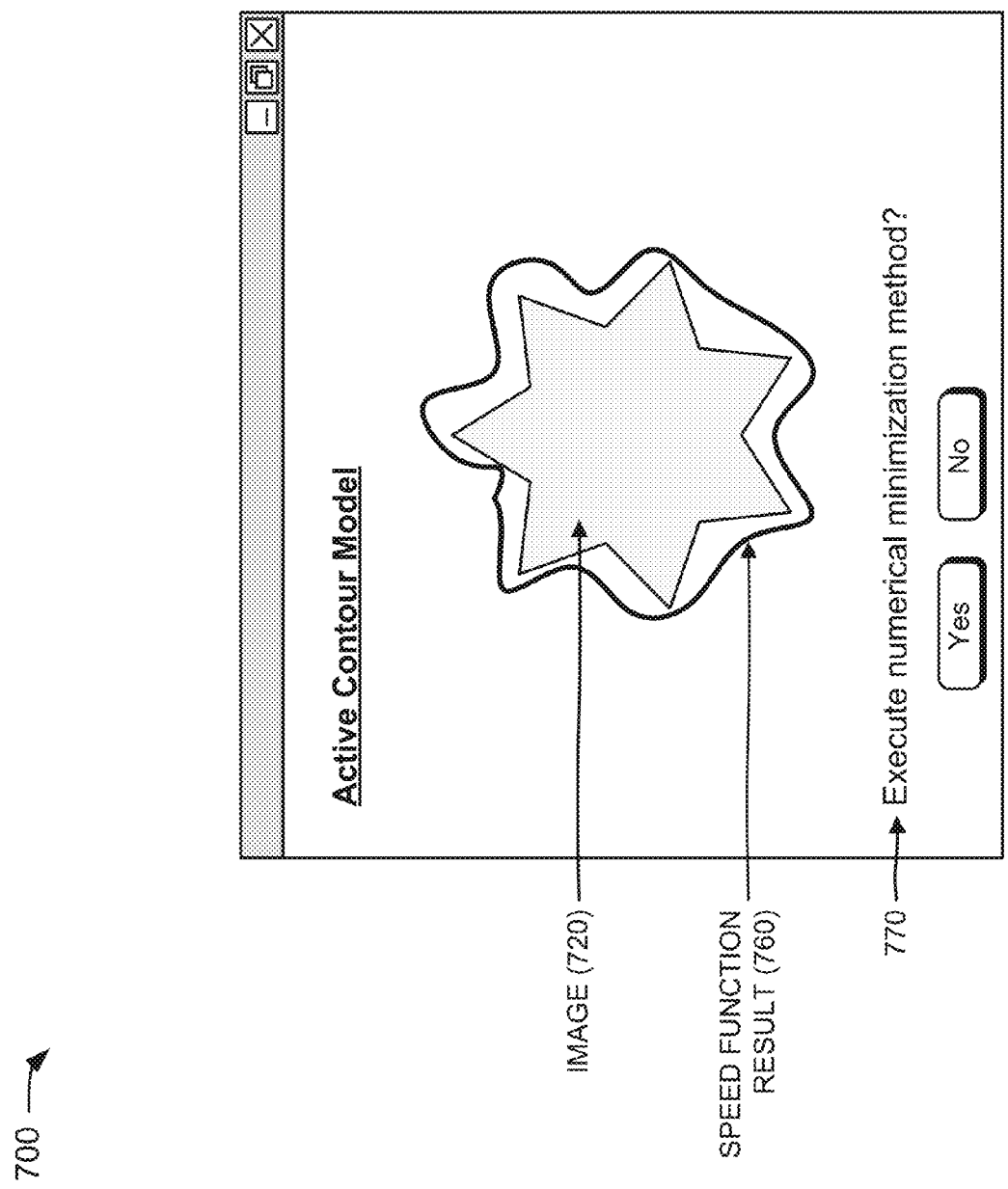

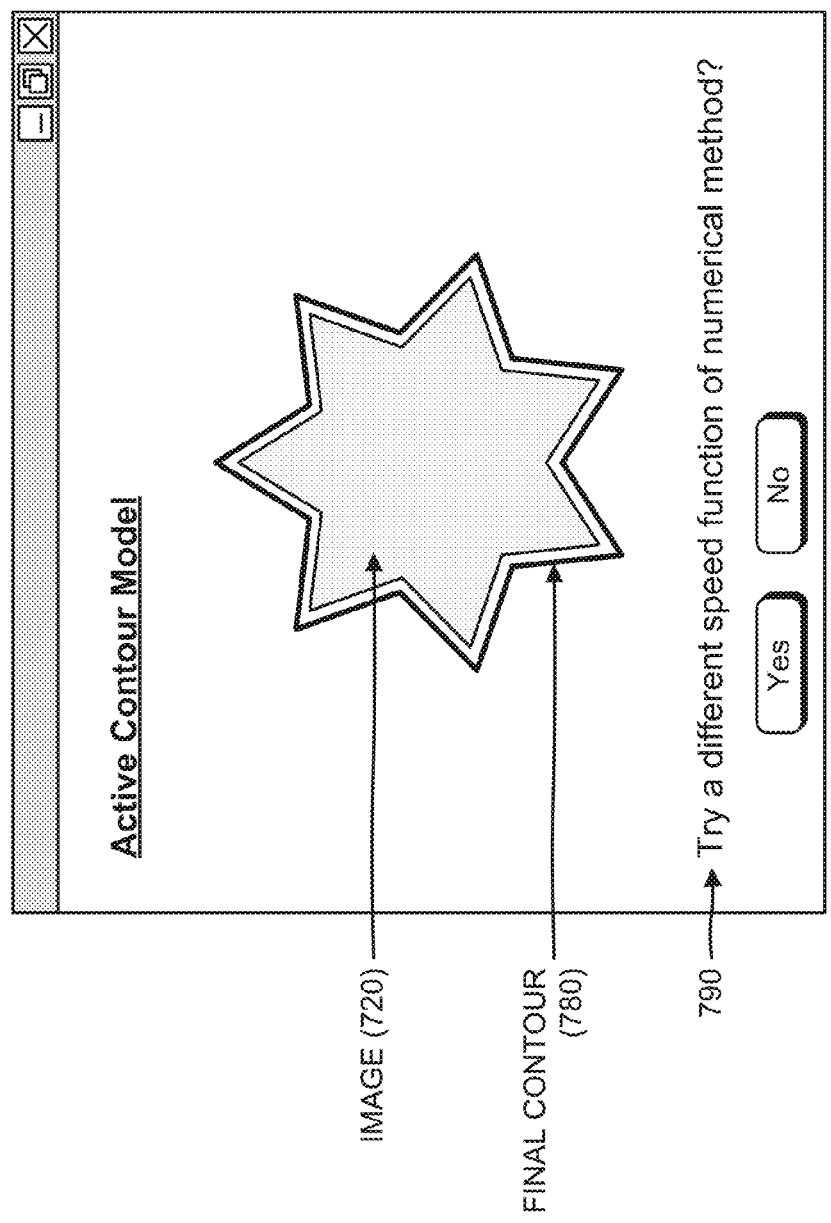

SPEED FUNCTION MODULE AND NUMERICAL MINIMIZATION MODULE FOR AN ACTIVE CONTOUR MODEL

RELATED APPLICATION

This application claims priority under 35 U.S.C. §119 based on U.S. Provisional Patent Application No. 61/735,813, filed Dec. 11, 2012, the disclosure of which is incorporated by reference herein in its entirety.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 1 is a diagram of an overview of an example implementation described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for receiving a speed function and numerical minimization method for modules of an active contour model;

FIGS. 7A-7E are diagrams of an example of the process described in connection with FIG. 6.

DETAILED DESCRIPTION

Figure 5A:
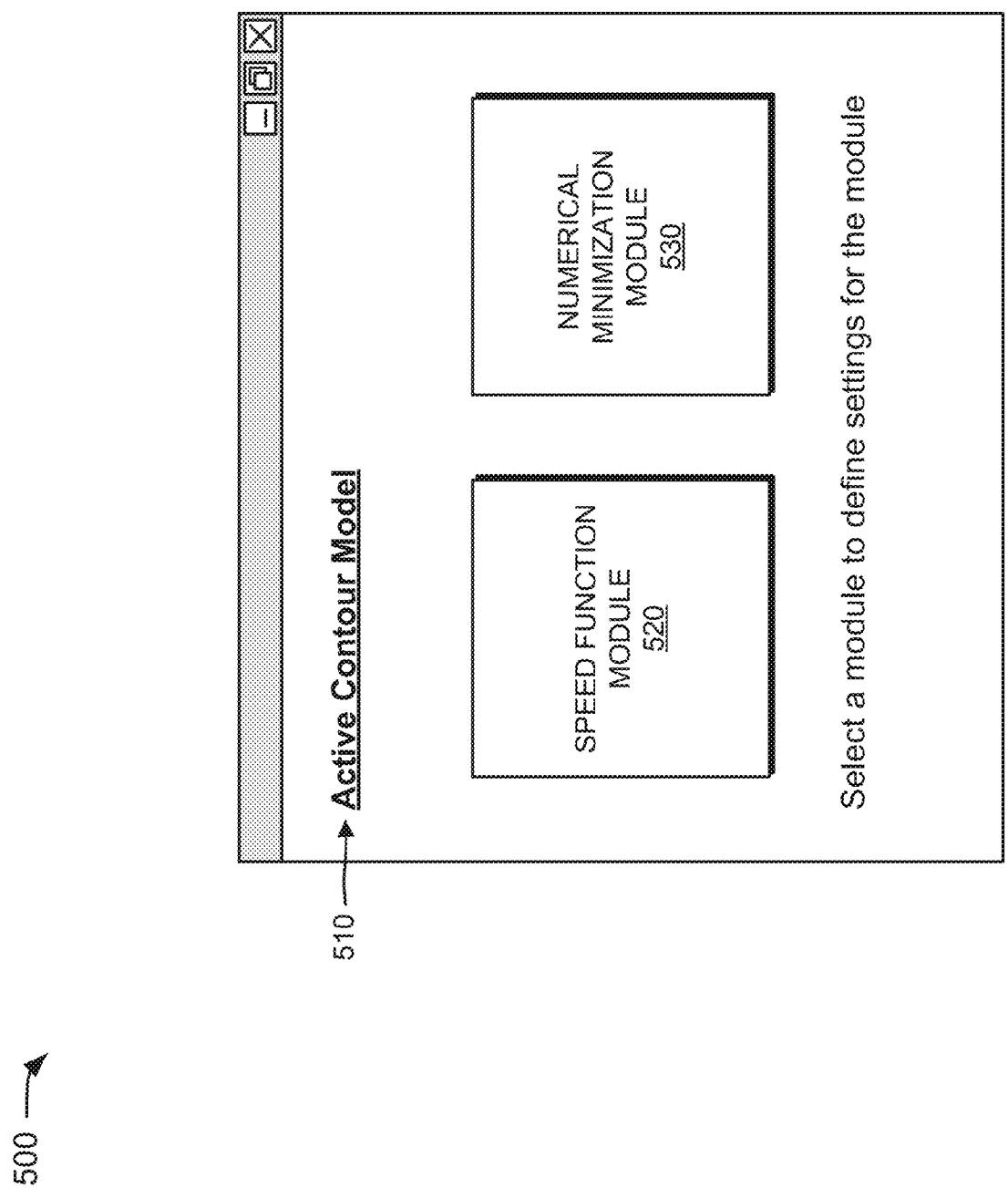
FIGS. 5A-5D are diagrams of an example of the process described in connection with FIG. 4.

The following detailed description refers to the accompanying drawings. The same reference numbers in different drawings may identify the same or similar elements.

An active contour model (also called "snakes") may include a framework for delineating an object outline or contour from an image. The active contour model may be used in a variety of applications, such as object tracking, shape recognition, segmentation, edge detection, stereo matching, etc. The framework may include algorithms to guide fitting the contour to the image. The contour may represent a curve or surface that deforms under the influence of forces in order to fit to the image. For example, in two-dimensional image segmentation, the contour may be a closed curve that is initialized at an arbitrary position on the image. An internal force, based on properties of the contour, such as curvature and smoothness, may act on and guide deformation of the contour. An external force, based on properties of the image, such as image gradient (e.g., edges) and region statistics, also may act on and guide deformation of the contour.

For image segmentation, the active contour model may define the internal and external forces in such a way that the contour deforms and settles on borders of an object(s) to be segmented in the image. The active contour model may define a problem in terms of an energy functional that associates an energy value with any given state of the contour. The energy functional may be formulated in such a way that a contour state associated with a minimum energy value may yield a final contour that fits the image. Thus, the active contour model may include the energy functional portion and an energy minimization (or optimization) portion that may be computationally solved. The energy minimization portion may include a numerical method used for minimizing the energy functional.

Current techniques for implementing the active contour model may include monolithic computational constructs (e.g., functions, classes, etc.) where the energy functional and the energy minimization portions are indistinguishably entangled. For example, many active contour models may apply the energy minimization method (e.g., evolution equations) to the energy functional using a single thread. However, not every numerical method can be used to minimize every energy functional, which may add complexity to understanding the distinction between the energy functional portion and the energy minimization portion.

The entanglement between the energy functional portion and the energy minimization portion may prevent extensibility and reusability of code associated with the portions. For example, assume that a user wants to use a different energy functional, but the same numerical minimization method as used in an existing implementation. In such situations, there may be no easy way to reuse the code from the existing implementation, and the user typically may have to re-write the code from scratch.

Overview

Systems and/or methods described herein may provide an active contour model that includes a speed function module that is separate and distinct from a numerical minimization method module. A speed function may be derived from the energy functional and may define a force that moves a contour. The speed function may include a one-to-one correspondence with the energy function. Thus, the energy functional module may be replaced with a speed function module. The active contour model may enable a user to reuse different speed functions or numerical minimization methods without having to re-write code from scratch.

FIG. 1 is a diagram of an overview of an example implementation described herein. For the overview, assume that a device (not shown in FIG. 1) receives an image, such as a two-dimensional or a three-dimensional image. A user may utilize the device to provide an initial contour for the received image. For example, the user may utilize a mouse or other pointer device to trace the initial contour for the image. The device may display the image with the initial contour. The user may provide an active contour model to the device or may select the active contour model from a list of active contour models provided by the device.

As further shown in FIG. 1, the active contour model may include a speed function module and a separate numerical minimization module. The speed function module may include a speed function provided by the user. The speed function may include, for example, a Chan-Vese model, a Geodesic model, etc. The numerical minimization module may include a numerical minimization method provided by the user. The numerical minimization method may include, for example, an explicit method, an additive operator splitting (AOS) method, a sparse field method, a gradient-descent method, etc. The device may provide the image and the initial contour to the speed function module.

The speed function module may utilize the speed function, the image, and a current contour location to compute intermediate results, such as, for example, speed or movement values for various portions of the contour. The numerical minimization module may utilize the numerical minimization method and the information generated by the speed function module to move and/or deform the contour a little. This process may be repeated. For example, the speed function module may again compute the speed values for the image and the updated contour location, and may provide this information to the numerical minimization module. The numerical minimization module may move the contour a little bit more. In this way, the two modules may iteratively move the contour from the initial contour, to an intermediate contour, and finally to a final contour.

The intermediate contour may conform more to the outline of the image than the initial contour conforms to the outline of the image. The device may provide the image and the intermediate contour for display to the user. As shown in FIG. 1, the final contour may include a contour that conforms to the outline of the image. The device may provide the image and the final contour for display to the user. The final contour may be used in a variety of applications, such as image tracking, image recognition, segmentation, edge detection, stereo matching, etc.

Such an arrangement may enable the user to use different speed functions or numerical minimization methods without having to re-write code from scratch. The speed function module and/or the numerical minimization module may be extended by the user, which may provide flexibility to the user. For example, the user may provide a speed function, written by the user or another user, to the speed function module, and may utilize a numerical minimization method provided in the numerical minimization module. Similarly, the user may provide a numerical minimization method, written by the user or another user, to the numerical minimization module, and may utilize a speed function provided in the speed function module. This code reusability may be beneficial to the user since the user may not have to waste time re-writing code.

The terms code and program code, as used herein, are to be used interchangeably and are to be broadly interpreted to include text-based code that may require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

Example Environment Arrangement

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more computation devices, such as, for example, a laptop computer, a personal computer, a tablet computer, a desktop computer, a workstation computer, a smart phone, a personal digital assistant (PDA), and/or other computation devices. In some implementations, client device 210 may include a TCE 240, described below.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

As indicated above, TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). In some implementations, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Example Process for Receiving a Speed Function and a Numerical Minimization Method for Modules of an Active Contour Model FIG. 4 is a flow chart of an example process 400 for receiving a speed function and numerical minimization method for modules of an active contour model. In some implementations, process 400 may be performed by client device 210 (e.g., TCE 240). In some implementations, process 400 may be performed by another device or a group of devices (e.g., server device 220) separate from or including client device 210.

As shown in FIG. 4, process 400 may include providing for display a representation of a first module, of an active contour model, that defines an interface for speed functions (block 410). For example, client device 210/TCE 240 may provide for display a representation of a speed function module of an active contour model. In some implementations, the representation of the speed function module may include a mechanism (e.g., an icon, a block, a link, etc.) that may be selected by the user. When the mechanism is selected, client device 210/TCE 240 may provide an interface that enables the user to provide settings for the speed function module. In some implementations, the settings for the speed function module may include the identification of a speed function. The speed function may be selected from a list of available speed functions, may be uploaded by the user to the speed function module, may be suggested by client device 210/TCE 240, etc. The suggested speed functions may be based on a number of times the user has previously utilized the suggested speed functions. For example, a particular speed function may be suggested since the user previously utilized the particular speed function the most number of times.

In some implementations, client device 210/TCE 240 may not provide a representation of the speed function module, and may receive the settings for the speed function module via other means. For example, client device 210/TCE 240 may provide one or more command prompts that request the settings for the speed function module. The user may provide the settings for the speed function module via the one or more command prompts.

As further shown in FIG. 4, process 400 may include receiving a speed function via the first module of the active contour model (block 420). For example, client device 210/TCE 240 may receive a speed function via the displayed representation of the speed function module. In some implementations, the speed function may include, for example, a Chan-Vese model, a Geodesic model, etc. In some implementations, the active contour model may include a generic evolution equation expressed as:

$$\frac{dC}{dt} = -s\vec{N},$$

where C may correspond to an active contour function, $\vec{N}$ may correspond to a contour, and s may correspond to a speed function that defines a force to move the contour ($\vec{N}$). The speed function may be derived from an energy functional, and there may be a one-to-one correspondence between the speed function and the energy functional. For example, a unique speed function may be derived from a unique energy functional.

Client device 210/TCE 240 may store the speed function (e.g., in main memory 330, FIG. 3) and/or may provide the received speed function in the speed function module so that the speed function module encapsulates computational elements of the speed function. In some implementations, the speed function module may include a software object (e.g., an ActiveContourSpeed class). The ActiveContourSpeed class may be an abstract base class that defines an interface for speed functions. The ActiveContourSpeed class may include various settings associated with the speed function, such as, for example, an initial speed setting (e.g., initializeSpeed), a calculate speed setting (e.g., calculateSpeed), an update speed setting (e.g., updateSpeed), etc.

The ActiveContourSpeed class may be extended to implement other speed functions through an inheritance relationship. For example, the ActiveContourSpeed class may be extended to implement a Chan-Vese speed function via a software object (e.g., an ActiveContourSpeedChanVese class), an edge-based speed function via a software object (an ActiveContourSpeedEdgeBased class), and/or a speed function defined by a user. The ActiveContourSpeedChanVese class may include the settings associated with the ActiveContourSpeed class, as well as a lambda setting, an inner contour mean setting, an inner contour area setting, an outer contour mean setting, an outer contour area setting, etc. The ActiveContourSpeedEdgeBased class may include the settings associated with the ActiveContourSpeed class, as well as a lambda setting, an image gradient setting, etc.

In some implementations, the speed function module may include one or more functions (e.g., rather than software objects) that define an interface for speed functions. The interface may be used to receive a speed function for the speed function module to execute.

As further shown in FIG. 4, process 400 may include providing for display a representation of a second module, of an active contour model, that defines an interface for numerical minimization methods (block 430). For example, client device 210/TCE 240 may provide for display a representation of a numerical minimization module of the active contour model. In some implementations, the representation of the numerical minimization module may include a mechanism (e.g., an icon, a block, a link, etc.) that may be selected by the user. When the mechanism is selected, client device 210/TCE 240 may provide an interface that enables the user to provide settings for the numerical minimization module. In some implementations, the settings for the numerical minimization module may include identification of a numerical minimization method. The numerical minimization method may be selected from a list of available numerical minimization methods, may be uploaded by the user to the numerical minimization module, may be suggested by client device 210/TCE 240, etc. The suggested numerical minimization methods may be based on a number of times the user has previously utilized the suggested numerical minimization methods. For example, the a particular numerical minimization method may be suggested since the user previously utilized the particular numerical minimization method the most number of times.

In some implementations, client device 210/TCE 240 may not provide a representation of the numerical minimization module, and may receive the settings for the numerical minimization module via other means. For example, client device 210/TCE 240 may provide one or more command prompts that request the settings for the numerical minimization module. The user may provide the settings for the numerical minimization module via the one or more command prompts.

Returning to FIG. 4, process 400 may include receiving a numerical minimization method via the second module of the active contour model (block 440). For example, client device 210/TCE 240 may receive a numerical minimization method via the displayed representation of the numerical minimization module. In some implementations, the numerical minimization method may include, for example, an explicit method, an AOS method, a sparse field method, a gradient-descent method, etc.

Client device 210/TCE 240 may store the numerical minimization method (e.g., in main memory 330, FIG. 3) and/or may provide the numerical minimization method in the numerical minimization module. In some implementations, the numerical minimization module may encapsulate computational elements for energy minimization and contour evolution, and, thus, may aggregate the ActiveContourSpeed class. In these implementations, since the numerical minimization module aggregates the ActiveContourSpeed class (e.g., the speed function module), the numerical minimization module may include all of the elements of the active contour model. In some implementations, the numerical minimization module may not aggregate the ActiveContourSpeed class, and the active contour model may include a third module that aggregates the speed function module and the numerical minimization module.

In some implementations, the numerical minimization module may include a software object (e.g., an ActiveContourEvolver class). The ActiveContourEvolver class may be an abstract base class that defines an interface for numerical minimization methods. The ActiveContourEvolver class may include various settings associated with the numerical minimization method, such as, for example, a numeric dimensions setting (e.g., NumDimensions), a contour speed setting (e.g., ContourSpeed), an image setting (e.g., Image), a contour state setting (e.g., ContourState), a move contour setting (e.g., moveActiveContour), a plot setting (e.g., plot), etc.

The ActiveContourEvolver class may be extended to implement other numerical minimization methods through an inheritance relationship. For example, the ActiveContourEvolver class may be extended to implement a numerical minimization method defined by a user. In some implementations, the numerical minimization module may include one or more functions (e.g., rather than software objects) that define an interface for numerical minimization methods. The interface may be used to receive a numerical minimization method for the numerical minimization module to execute.

As further shown in FIG. 4, process 400 may include providing a representation of the active contour model, with the speed function and the numerical minimization method, for display (block 450). For example, client device 210/TCE 240 may provide a representation of the active contour model for display to the user. In some implementations, the representation of the active contour model may include the representation of the speed function module and the representation of numerical minimization module. In some implementations, the representation of the speed function module may include a representation of the received speed function, and the representation of the numerical minimization module may include a representation of the received numerical minimization method.

In some implementations, client device 210/TCE 240 may provide information requesting whether the user wants to use the active contour model. If the user wants to use the active contour model, the user may provide an input, to client device 210/TCE 240, indicating that the user wants to user the active contour model. Client device 210/TCE may receive the input and may begin executing the active contour model. Further details of execution of the active contour model are described below in connection with, for example, one or more of FIGS. 6-7E.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Example of Receiving a Speed Function and a
Numerical Minimization Method for an Active
Contour Model FIGS. 5A-5D are diagrams of an example 500 of the process described above with respect to FIG. 4. In example 500, assume that client device 210/TCE 240 provides an active contour model 510 for display to a user. Active contour model 510 may include a speed function module and a numerical minimization module. As shown in FIG. 5A, client device 210/TCE 240 may provide, for display to the user, a representation 520 (e.g., a block, an icon, a link, etc.) of the speed function module and a representation 530 (e.g., a block, an icon, a link, etc.) of the numerical minimization module. Client device 210/TCE 240 may also provide information instructing the user to select a module to define settings for the selected module.

Figure 5B:
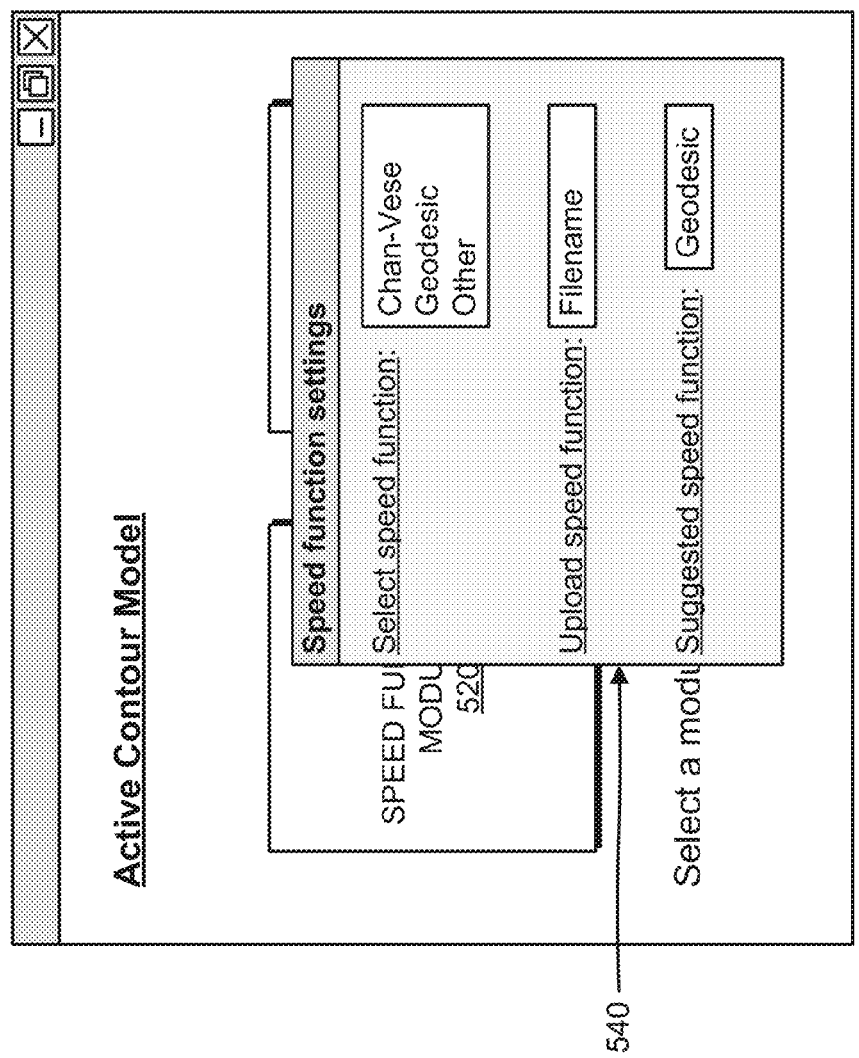

In example 500, assume that the user utilizes client device 210 to select representation 520 of the speed function module. When the user selects representation 520, client device 210/TCE 240 may provide a user interface 540 (e.g., a window, a menu, etc.) for display to the user, as shown in FIG. 5B. User interface 540 may enable the user to enter settings for the speed function. For example, user interface 540 may display a list of speed functions (e.g., a Chan-Vese method, a geodesic method, etc.) from which the user may select a speed function for the speed function module.

In some implementations, user interface 540 may request that the user upload a speed function for the speed function module. The user may identify a name and a location of the speed function to cause the speed function to be uploaded to the speed function module. In some implementations, user interface 540 may provide one or more suggested speed functions (e.g., a geodesic model) for the speed function module.

In any event the user may identify a speed function to be associated with the speed function module. As indicated above, the suggested speed functions may be based on a number of times the user has previously utilized the suggested speed functions. For example, the geodesic model may be suggested since the user previously utilized the geodesic model the most number of times. In some implementations, the suggested speed functions may include a last used speed function, speed functions based on user context (e.g., what type of image is to be analyzed), etc.

If the user does not select representation 520 of the speed function module, client device 210/TCE 240 may utilize a last used speed function, a most used speed function, etc. as a default speed function for the speed function module. In some implementations, client device 210/TCE 240 may enable the user to select multiple speed functions for the speed function module, and may execute the multiple speed functions in parallel or serially. This may enable the user to compare results of the multiple speed functions and to pick a speed function that provides the best result.

Figure 5C:
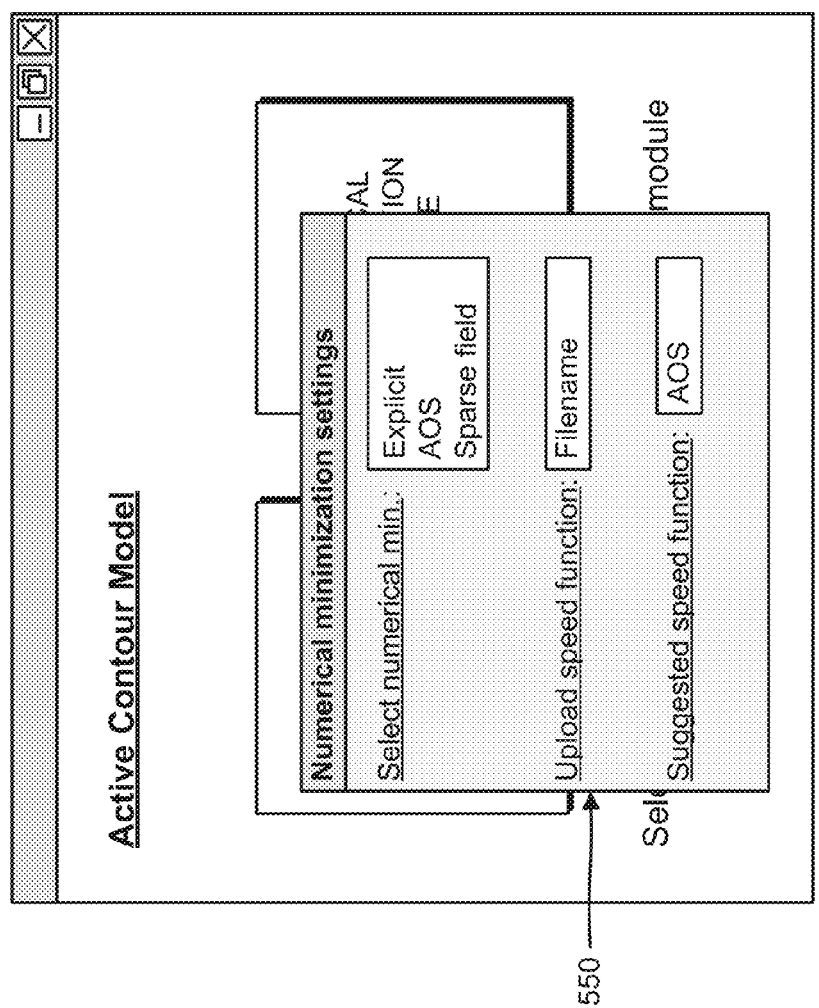

Assume now that the user utilizes client device 210 to select representation 530 of the numerical minimization module. When the user selects representation 530, client device 210/TCE 240 may provide a user interface 550 (e.g., a window, a menu, etc.) for display to the user, as shown in FIG. 5C. User interface 550 may enable the user to enter settings for the numerical minimization method. For example, user interface 550 may display a list of numerical minimization methods (e.g., an explicit method, an AOS method, a sparse field method, etc.) from which the user may select a numerical minimization method for the numerical minimization module.

In some implementations, user interface 550 may request that the user upload a numerical minimization method for the numerical minimization module. The user may identify a name and a location of the numerical minimization method to cause the numerical minimization method to be uploaded to the numerical minimization module. In some implementations, user interface 550 may provide one or more suggested numerical minimization methods (e.g., an AOS model) for the numerical minimization module. In any event the user may identify a numerical minimization method to be associated with the numerical minimization module. As indicated above, the suggested numerical minimization methods may be based on a number of times the user has previously utilized the suggested numerical minimization methods. For example, the AOS model may be suggested since the user previously utilized the AOS model the most number of times. In some implementations, the suggested numerical minimization methods may include a last used numerical minimization method, numerical minimization methods based on user context (e.g., what type of image is to be analyzed), etc.

If the user does not select representation 530 of the numerical minimization module, client device 210/TCE 240 may utilize a last used numerical minimization method, a most used numerical minimization method, etc. as a default numerical minimization method for the numerical minimization module. In some implementations, client device 210/TCE 240 may enable the user to select multiple numerical minimization methods for the numerical minimization module, and may execute the multiple numerical minimization methods in parallel or serially. This may enable the user to compare results of the multiple numerical minimization methods and to pick a numerical minimization method that provides the best result.

Once the user has provided the speed function for the speed function module, client device 210/TCE 240 may provide a representation 560 (e.g., a block, an icon, a link, etc.) of the speed function in representation 520 of the speed function module. Once the user has provided the numerical minimization method for the numerical minimization module, client device 210/TCE 240 may provide a representation 570 (e.g., a block, an icon, a link, etc.) of the numerical minimization method in representation 530 of the numerical minimization module. Client device 210/TCE 240 may provide representation 560 of the speed function and representation 570 of the numerical minimization method for display to the user, as shown in FIG. 5D.

Figure 5D:
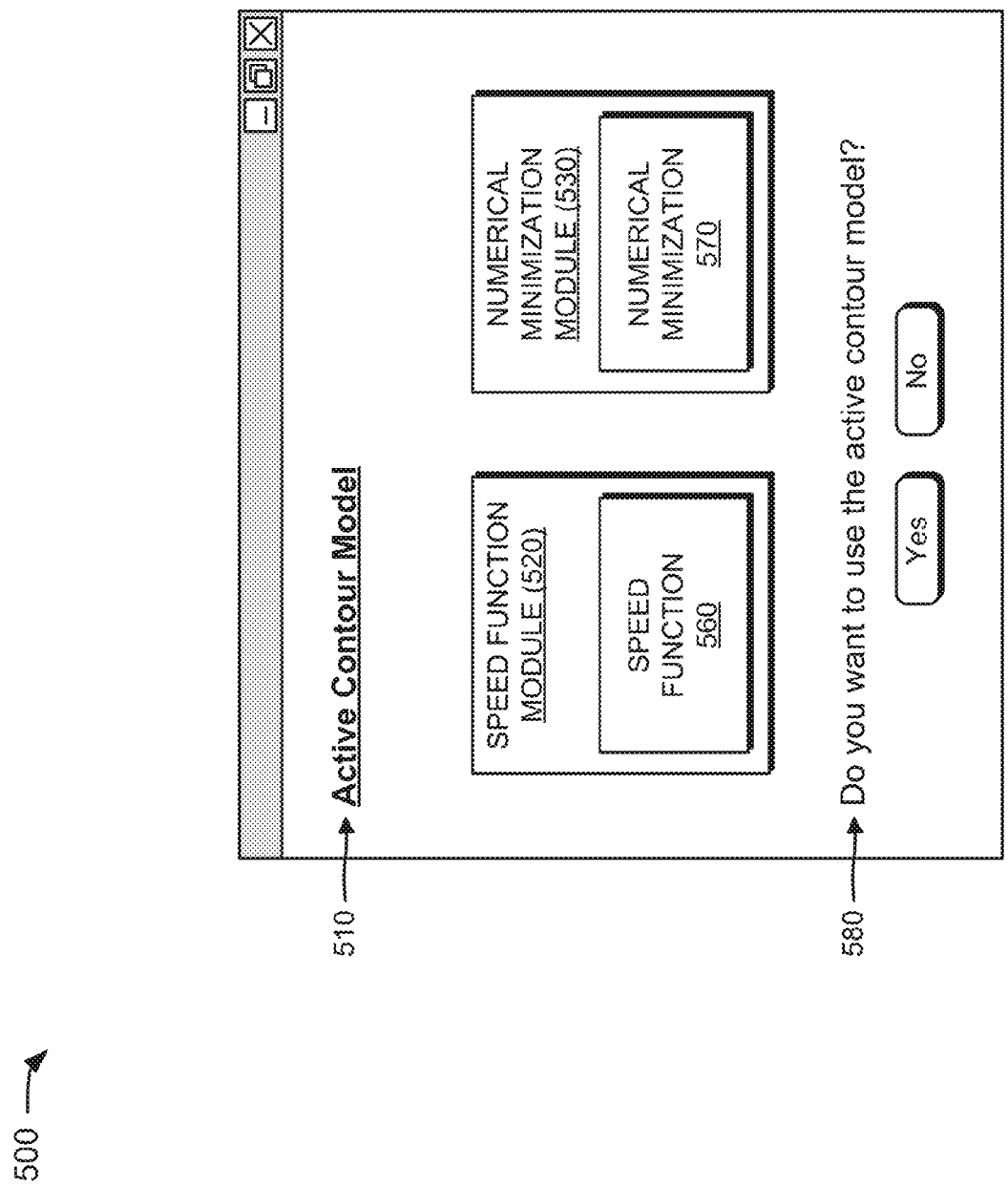

As further shown in FIG. 5D, client device 210/TCE 240 may request whether the user wants to use active contour model 510, as indicated by reference number 580. If the user wants to use active contour model 510, the user may select a mechanism (e.g., a "Yes" button, link, icon, etc.) and client device 210/TCE 240 may execute active contour model 510, as described below in connection with FIGS. 6-7E. If the user does not want to use active contour model 510, the user may select another mechanism (e.g., a "No" button, link, icon, etc.), and client device 210/TCE 240 may store active contour model 510 for later use.

Figure 6:
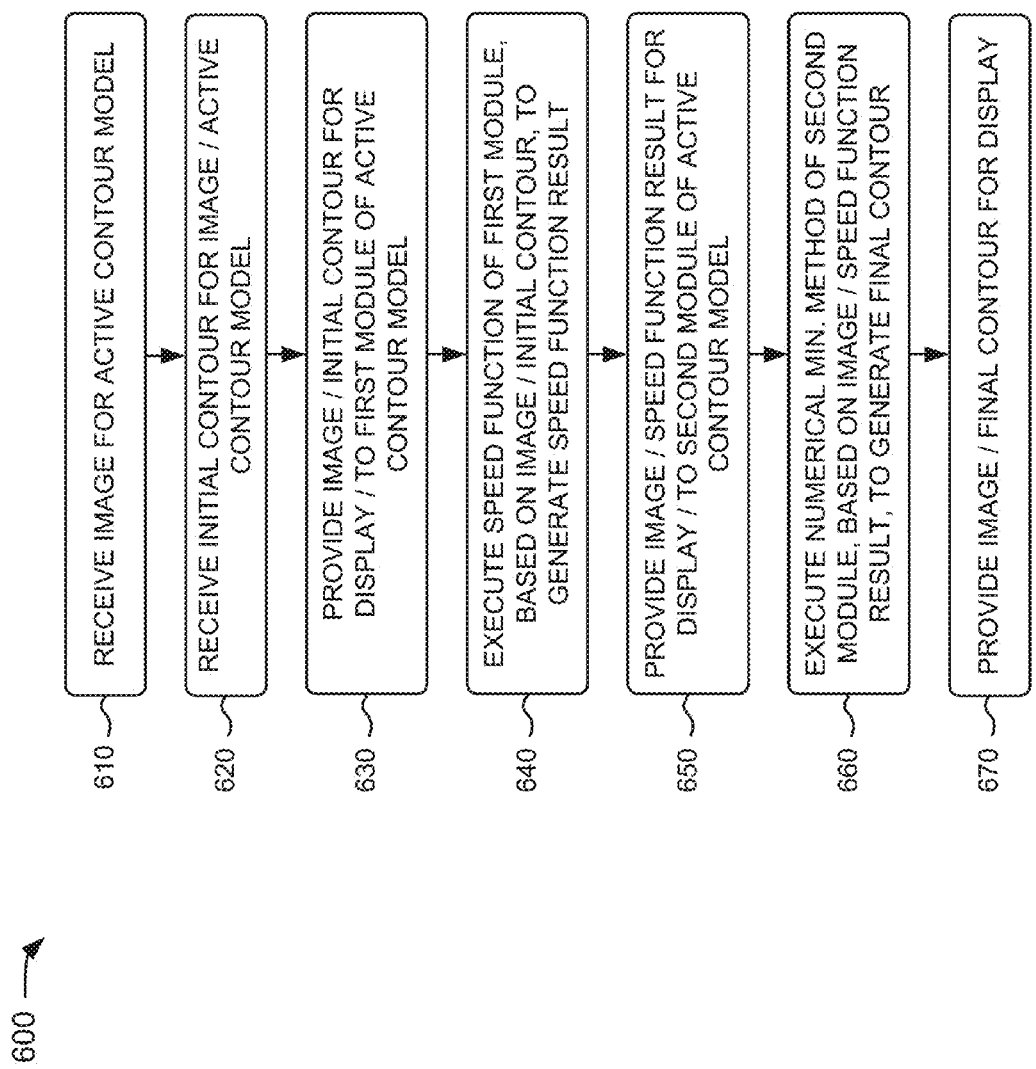
FIG. 6 is a flow chart of an example process for using a speed function module and a numerical minimization module of an active contour model.
Figure 7A:

Example Process for Using a Speed Function Module and a Numerical Minimization Module of an Active Contour Model FIG. 6 is a flow chart of an example process 600 for using a speed function module and a numerical minimization module of an active contour model. In some implementations, process 600 may be performed by client device 210 (e.g., TCE 240). In some implementations, process 600 may be performed by another device or a group of devices (e.g., server device 220) separate from or including client device 210.

As shown in FIG. 6, process 600 may include receiving an image for an active contour model (block 610). For example, client device 210/TCE 240 may receive an image to be processed by an active contour model provided by client device 210/TCE 240. In some implementations, client device 210/TCE 240 may receive the image from server device 220, may retrieve the image from memory (e.g., main memory 330, FIG. 3), may receive the image from a user of client device 210/TCE 240 (e.g., via user inputs), etc. The image may include a two-dimensional image, a three-dimensional image, etc. in a variety of formats, such as, for example, a Joint Photographic Experts Group (JPEG) format, a Tagged Image File Format (TIFF), etc. In some implementations, the image may include a portion (e.g., a frame) of a video file provided in a variety of formats, such as, for example, an audio video interleave (AVI) format, a QuickTime movie (MOV) format, a moving picture experts group (MPEG) format, a Windows media video (WMV) format, etc.

As further shown in FIG. 6, process 600 may include receiving an initial contour for the image and the active contour model (block 620). For example, client device 210/TCE 240 may instruct the user to input an initial contour for the image. Based on the instruction, the user may provide the initial contour to client device 210/TCE 240. In some implementations, the user may draw the initial contour (e.g., with a mouse, a keyboard, etc. of client device 210) around or adjacent to the image. In some implementations, client device 210/TCE 240 may provide a grid with coordinates around the image, and the user may provide coordinates for the initial contour. Based on the provided coordinates, client device 210/TCE 240 may generate the initial contour around or adjacent to the image.

As further shown in FIG. 6, process 600 may include providing the image and the initial contour for display and to a first module of the active contour model (block 630). For example, client device 210/TCE 240 may provide the image for display when the image is received by client device 210/TCE 240. Client device 210/TCE 240 may provide the initial contour for display when the initial contour is received by client device 210/TCE 240. In some implementations, client device 210/TCE 240 may provide the image and the initial contour to a speed function module of the active contour model. The speed function module may receive the image and the initial contour. In some implementations, client device 210/TCE 240 may store the image and/or the initial contour (e.g., in main memory 330, FIG. 3).

Returning to FIG. 6, process 600 may include executing a speed function of the first module, based on the image and the initial contour, to generate a speed function result (block 640). For example, the speed function module may include a speed function provided by the user, as described above in connection with FIGS. 4-5D. The speed function may include, for example, a Chan-Vese model, a Geodesic model, etc. The speed function module may execute the speed function, based on the image and the initial contour, to generate a speed function result. For example, the speed function module may utilize the speed function, the image, and a current contour location to compute intermediate results, such as, for example, speed values for various portions of the initial contour.

As further shown in FIG. 6, process 600 may include providing the image and the speed function result for display and to a second module of the active contour model (block 650). For example, client device 210/TCE 240 may provide the image and the speed function result (e.g., an intermediate contour) for display when the speed function result is generated by the speed function of the speed function module. In some implementations, client device 210/TCE 240 may provide the image and the speed function result to a numerical minimization module of the active contour model. The numerical minimization module may receive the image and the speed function result. In some implementations, client device 210/TCE 240 may store the speed function result (e.g., in main memory 330, FIG. 3).

Returning to FIG. 6, process 600 may include executing a numerical minimization method of the second module, based on the image and the speed function result, to generate a final contour (block 660). For example, the numerical minimization module may include a numerical minimization method provided by the user, as described above in connection with FIGS. 4-5D. The numerical minimization method may include, for example, an explicit method, an AOS method, a sparse field method, a gradient-descent method, etc. The numerical minimization module may utilize the numerical minimization method and the information generated by the speed function module to move and/or deform the contour a little. This process may be repeated. For example, the speed function module may again compute the speed values for the image and the updated contour location, and may provide this information to the numerical minimization module. The numerical minimization module may move the contour a little bit more. In this way, the two modules may iteratively move the contour from the initial contour, to an intermediate contour, and finally to a final contour.

In some implementations, if the image includes multiple objects to which the user wanted to apply the active contour model, client device 210/TCE 240 may enable the user to provide an initial contour for each object. Client device 210/TCE 240 may also enable the user to specify a speed function and a numerical minimization method for each object of the image so that different speed functions and/or numerical minimization methods may be utilized for different objects of the image. Client device 210/TCE 240 may execute the specified speed functions and numerical minimization methods so that a final contour may be generated for and conform to each object of the image.

As further shown in FIG. 6, process 600 may include providing the image and the final contour for display (block 670). For example, client device 210/TCE 240 may provide the image and the final contour for display to the user. The final contour may be used by the user in a variety of applications, such as image tracking, image recognition, segmentation, edge detection, stereo matching, etc. In some implementations, client device 210/TCE 240 may store the final contour (e.g., in main memory 330, FIG. 3).

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Example Utilization of a Speed Function Module and a Numerical Minimization Module of an Active Contour Model FIGS. 7A-7E are diagrams of an example 700 of the process described above with respect to FIG. 6. In example 700, assume that client device 210/TCE 240 receives an instruction from a user to implement an active contour model, such as active contour model 510 described above in connection with FIGS. 5A-5D. Based on the instruction, client device 210/TCE 240 may execute the active contour model. Execution of the active contour model may cause client device 210/TCE 240 to request that the user upload an image for the active contour model, as indicated by reference number 710 in FIG. 7A. Based on the request, further assume that the user provides a filename of an image to client device 210/TCE 240 and selects a mechanism (e.g., an "Upload" button, icon, link, etc.) to upload the image to client device 210/TCE 240.

Client device 210/TCE 240 may receive the uploaded image, and may display the uploaded image, as indicated by reference number 720 in FIG. 7B. As shown in FIG. 7B, image 720 may include a two-dimensional image of a seven-point star. Execution of the active contour model may cause client device 210/TCE 240 to request that the user provide an initial contour for image 720, as indicated by reference number 730 in FIG. 7B. Based on the request, assume that the user utilizes client device 210 to provide an initial contour for image 720. For example, the user may utilize a mouse or other pointer device, of client device 210, to trace the initial contour for image 720.

Client device 210/TCE 240 may display image 720 with an initial contour 740 provided by the user, as shown in FIG. 7C. As shown, initial contour 740 may be provided around or adjacent to image 720. In some implementations, initial contour 740 may not be provided around image but may be provided adjacent to (e.g., within a particular distance from) image 720. In some implementations, initial contour 740 may include a closed shape (e.g., a square, a rectangle, a circle, an oval, a polygon, etc.) or a non-closed shape (e.g., a line, two connected lines, etc.). As further shown in FIG. 7C, execution of the active contour model may cause client device 210/TCE 240 to request whether or not the user wants to execute a speed function of the active contour model, as indicated by reference number 750. Based on the request, assume that the user selects a mechanism (e.g., a "Yes" button, icon, link, etc.) that instructs client device 210/TCE 240 to execute the speed function.

Client device 210/TCE 240 may execute the speed function, based on image 720 and initial contour 740, to generate a speed function result 760, as shown in FIG. 7D. For example, initial contour 740 may deform and converge toward an outline of image 720. Client device 210/TCE 240 may provide speed function result 760 for display with image 720, as shown in FIG. 7D. In some implementations, speed function result 760 may include an intermediate contour that conforms more to the outline of image 720 than initial contour 740 conforms to the outline of image 720. As further shown in FIG. 7D, execution of the active contour model may cause client device 210/TCE 240 to request whether or not the user wants to execute a numerical minimization method of the active contour model, as indicated by reference number 770. Based on the request, assume that the user selects a mechanism (e.g., a "Yes" button, icon, link, etc.) that instructs client device 210/TCE 240 to execute the numerical minimization method. In some implementations, the user may select another mechanism (e.g., a "No" button, icon, link, etc.) if the user does not wish to execute the numerical minimization method (e.g., if speed function result 760 provides a satisfactory result for the user).

Client device 210/TCE 240 may execute the numerical minimization method, based on image 720 and speed function result 760, to generate a final contour 780, as shown in FIG. 7E. For example, client device 210/TCE 240 may apply the numerical minimization method to speed function result 760 so that speed function result 760 deforms and converges toward the outline of image 720. Client device 210/TCE 240 may provide final contour 780 for display with image 720. In some implementations, final contour 780 may include a contour that conforms to the outline of image 720. As further shown in FIG. 7E, execution of the active contour model may cause client device 210/TCE 240 to request whether or not the user wants to try a different speed function or a different numerical minimization method, as indicated by reference number 790. If the user selects a mechanism (e.g., a "Yes" button, icon, link, etc.), client device 210/TCE 240 may enable the user to provide a different speed function or a different numerical minimization method, as described above in connection with FIGS. 5A-5D.

CONCLUSION

Systems and/or methods described herein may provide an active contour model that includes a speed function module that is separate and distinct from a numerical minimization method module. A speed function may be derived from the energy functional and may define a force that moves a contour. The speed function may include a one-to-one correspondence with the energy function. Thus, the energy functional module may be replaced with a speed function module. The active contour model may enable a user to use different speed functions or numerical minimization methods without having to re-write code from scratch.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving an image for an active contour model,
      the active contour model including a first module and a second module, and
      the receiving the image being performed by a device;
   receiving an initial contour for the image and the active contour model,
      the receiving the initial contour being performed by the device;
   providing the image and the initial contour to the first module of the active contour model,
      the providing the image and the initial contour being performed by the device;
   executing a first speed function of the first module, based on the image and the initial contour, to generate a first speed function result,
      the executing the first speed function being performed by the device;
   providing the image and the first speed function result to the second module of the active contour model,
      the providing the image and the first speed function result being performed by the device;
   executing a numerical minimization method of the second module, based on the image and the first speed function result, to generate an intermediate contour,
      the executing the numerical minimization method being performed by the device;
   executing the first speed function or a second speed function of the first module, based on the image and the intermediate contour, to generate a second speed function result after executing the numerical minimization method to generate the intermediate contour; and
   providing a final contour for display after generating the second speed function result,
      the providing the final contour being performed by the device.

2. The method of claim 1, where the active contour model is associated with a technical computing environment (TCE).

3. The method of claim 1, further comprising:
providing the image and the initial contour for display before executing the first speed function.

4. The method of claim 1, further comprising:
providing the image and the first speed function result for display before executing the numerical minimization method.

5. The method of claim 1, further comprising:
providing, for display, a representation of the first module of the active contour model,
where the representation of the first module defines an interface for speed functions; and
receiving information identifying the first speed function via the representation of the first module.

6. The method of claim 5, further comprising:
providing, for display, a representation of the second module of the active contour model,
where the representation of the second module defines an interface for numerical minimization methods; and
receiving information identifying the numerical minimization method via the representation of the second module.

7. The method of claim 6, further comprising:
providing, for display, a representation of the active contour model, a representation of the first speed function, and a representation of the numerical minimization method.

8. A non-transitory computer-readable medium for storing instructions, the instructions comprising:
one or more instructions that, when executed by a processor of a device, cause the processor to:
receive an image for an active contour model,
the active contour model including a first module and a second module,
receive an initial contour for the image and the active contour model,
provide the image and the initial contour to the first module of the active contour model,
execute a first speed function of the first module, based on the image and the initial contour, to generate a first speed function result,
provide the image and the first speed function result to the second module of the active contour model,
execute a numerical minimization method of the second module, based on the image and the first speed function result, to generate an intermediate contour,
execute the first speed function or a second speed function of the first module, based on the image and the intermediate contour, to generate a second speed function result after executing the numerical minimization method to generate the intermediate contour; and
provide a final contour for display based on the second speed function result.

9. The non-transitory computer-readable medium of claim 8, where the instructions further comprise:
one or more instructions that, when executed by the processor, cause the processor to:
provide a list of speed functions for display, and
receive a selection of the first speed function from the list of speed functions.

10. The non-transitory computer-readable medium of claim 8, where the instructions further comprise:
one or more instructions that, when executed by the processor, cause the processor to:
provide a list of numerical minimization methods for display, and
receive a selection of the numerical minimization method from the list of numerical minimization methods.

11. The non-transitory computer-readable medium of claim 8, where the instructions further comprise:
one or more instructions that, when executed by the processor, cause the processor to:
provide, for display, a representation of the first module of the active contour model,
where the representation of the first module defines an interface for speed functions, and
receive information identifying the first speed function via the representation of the first module.

12. The non-transitory computer-readable medium of claim 11, where the instructions further comprise:
one or more instructions that, when executed by the processor, cause the processor to:
provide, for display, a representation of the second module of the active contour model,
where the representation of the second module defines an interface for numerical minimization methods, and
receive information identifying the numerical minimization method via the representation of the second module.

13. The non-transitory computer-readable medium of claim 12, where the instructions further comprise:
one or more instructions that, when executed by the processor, cause the processor to:
provide, for display, a representation of the active contour model, a representation of the first speed function, and a representation of the numerical minimization method.

14. The non-transitory computer-readable medium of claim 8, where the active contour model is associated with a technical computing environment (TCE).

15. A device comprising:
one or more processors to:
receive an image for an active contour model,
the active contour model including a first module and a second module,
receive an initial contour for the image and the active contour model,
execute a first speed function of the first module, based on the image and the initial contour, to generate a first speed function result,
execute a numerical minimization method of the second module, based on the image and the first speed function result, to generate an intermediate contour,
execute a second speed function of the first module, based on the image and the intermediate contour, to generate a second speed function result after executing the numerical minimization method to generate the intermediate contour,
the second speed function being different from the first speed function, and
provide a final contour for display based on the second speed function result.

16. The device of claim 15, where the one or more processors are further to:
provide the image and the initial contour for display before executing the first speed function.

17. The device of claim 15, where the one or more processors are further to:

provide the image and the first speed function result for display before executing the numerical minimization method.

18. The device of claim 15, where the one or more processors are further to:
provide, for display, a representation of the first module of the active contour model,
where the representation of the first module defines an interface for speed functions, and
receive information identifying the first speed function via the representation of the first module.

19. The device of claim 18, where the one or more processors are further to:
provide, for display, a representation of the second module of the active contour model,
where the representation of the second module defines an interface for numerical minimization methods, and
receive information identifying the numerical minimization method via the representation of the second module.

20. The device of claim 19, where the one or more processors are further to:
provide, for display, a representation of the active contour model.

* * * * *